United States Patent
Hirota et al.

(10) Patent No.: US 8,099,952 B2
(45) Date of Patent: Jan. 24, 2012

(54) EXHAUST PURIFICATION DEVICE OF AN INTERNAL COMBUSTION ENGINE

(75) Inventors: Shinya Hirota, Susono (JP); Takamitsu Asanuma, Mishima (JP); Kohei Yoshida, Gotenba (JP); Hiromasa Nishioka, Susono (JP); Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 337 days.

(21) Appl. No.: 12/449,344

(22) PCT Filed: Aug. 15, 2008

(86) PCT No.: PCT/JP2008/064956
§ 371 (c)(1),
(2), (4) Date: Aug. 4, 2009

(87) PCT Pub. No.: WO2009/025343
PCT Pub. Date: Feb. 26, 2009

(65) Prior Publication Data
US 2010/0139259 A1 Jun. 10, 2010

(30) Foreign Application Priority Data
Aug. 21, 2007 (JP) ................................. 2007-214984

(51) Int. Cl.
*F01N 3/10* (2006.01)
*F01N 3/00* (2006.01)
(52) U.S. Cl. .......................................... 60/301; 60/285
(58) Field of Classification Search .................... 60/286, 60/295, 301, 303
See application file for complete search history.

(56) References Cited

U.S. PATENT DOCUMENTS

| | | | | |
|---|---|---|---|---|
| 6,397,582 | B1 * | 6/2002 | Hanaoka et al. | 60/274 |
| 7,210,288 | B2 * | 5/2007 | Bandl-Konrad et al. | 60/297 |
| 7,562,522 | B2 * | 7/2009 | Yan | 60/286 |
| 7,814,747 | B2 * | 10/2010 | Bandl-Konrad et al. | 60/297 |
| 2002/0116920 | A1 * | 8/2002 | Pfeifer et al. | 60/299 |
| 2005/0109022 | A1 * | 5/2005 | Nagaoka et al. | 60/297 |
| 2006/0010854 | A1 * | 1/2006 | Nakano et al. | 60/285 |
| 2006/0153761 | A1 * | 7/2006 | Bandl-Konrad et al. | 423/239.1 |

(Continued)

FOREIGN PATENT DOCUMENTS

JP   A-2002-242667   8/2002

(Continued)

OTHER PUBLICATIONS

Supplementary European Search Report issued in European Patent Application No. 08792627.5, dated Nov. 19, 2010.

*Primary Examiner* — Thomas Denion
*Assistant Examiner* — Patrick Maines
(74) *Attorney, Agent, or Firm* — Oliff & Berridge, PLC

(57) ABSTRACT

In an internal combustion engine, an $NO_x$ selective reducing catalyst is arranged inside an engine exhaust passage, an oxidation catalyst is arranged upstream of the $NO_x$ selective reducing catalyst, and an $NO_x$ adsorption catalyst is arranged upstream of the oxidation catalyst. The $NO_x$ adsorption catalyst has a property of releasing $NO_x$ when the temperature rises and a property of trapping the $SO_x$ contained in the exhaust gas. The inflow of $SO_x$ into the oxidation catalyst is suppressed by the $NO_x$ adsorption catalyst to prevent the NO released from the $NO_x$ adsorption catalyst being oxidized to $NO_2$ at the oxidation catalyst from being obstructed by $SO_x$.

3 Claims, 4 Drawing Sheets

U.S. PATENT DOCUMENTS

| | | | |
|---|---|---|---|
| 2007/0089403 A1* | 4/2007 | Pfeifer et al. | 60/286 |
| 2007/0175208 A1* | 8/2007 | Bandl-Konrad et al. | 60/286 |
| 2007/0277507 A1* | 12/2007 | Yan | 60/286 |
| 2009/0107121 A1* | 4/2009 | Yoshida et al. | 60/286 |
| 2010/0139259 A1* | 6/2010 | Hirota et al. | 60/301 |

FOREIGN PATENT DOCUMENTS

| | | |
|---|---|---|
| JP | A-2006-512529 | 4/2006 |
| JP | A-2006-519332 | 8/2006 |

* cited by examiner

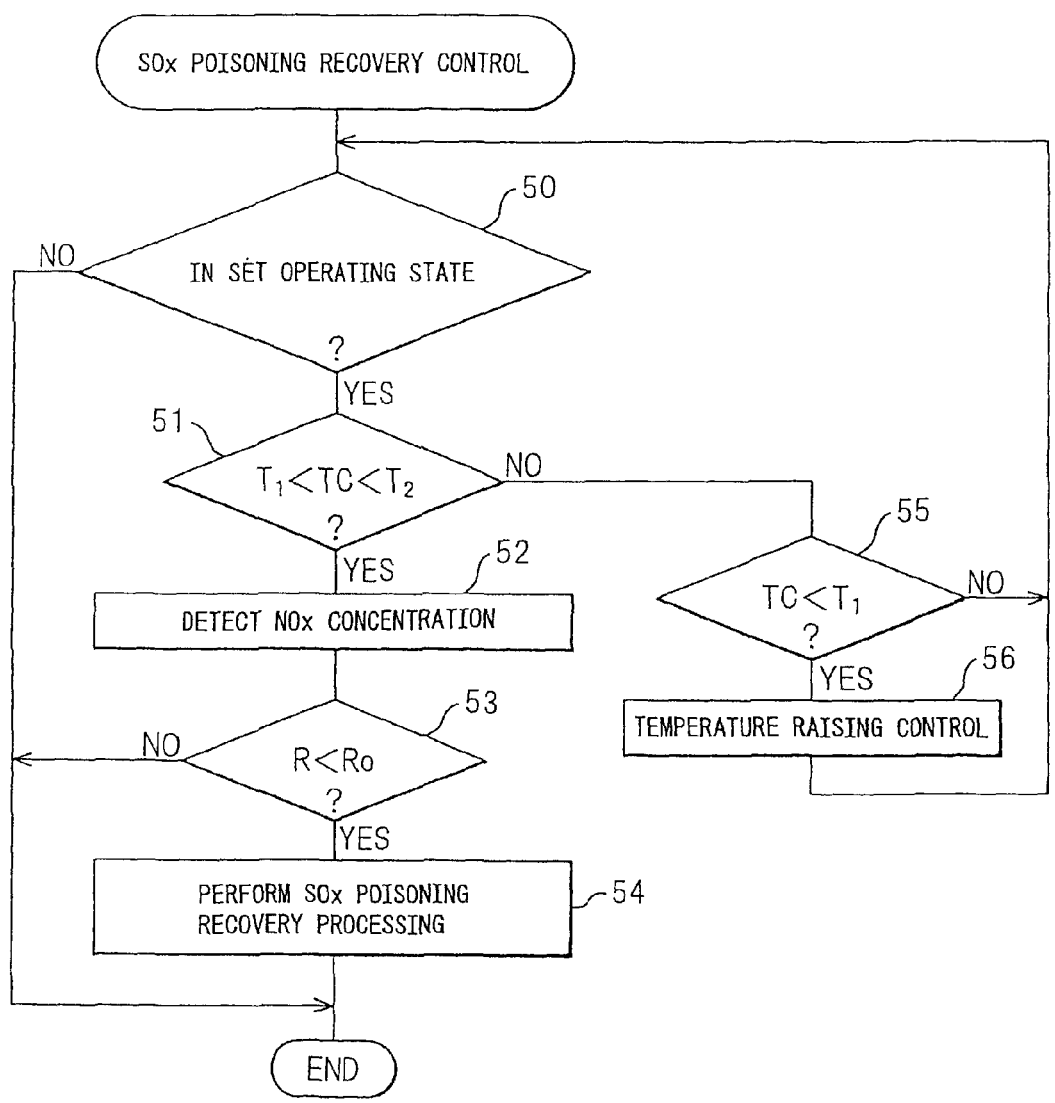

US 8,099,952 B2

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

Known in the art is an internal combustion engine arranging inside an engine exhaust passage an $NO_x$ storage catalyst storing $NO_x$ contained in the exhaust gas and releasing the stored $NO_x$ when feeding a reducing agent, arranging inside the engine exhaust passage downstream of the $NO_x$ storage catalyst an $NO_2$ producing catalyst, and arranging inside the engine exhaust passage downstream of the $NO_2$ producing catalyst an $NO_x$ selective reducing catalyst (see Japanese Patent Publication (A) No. 2006-512529). In this internal combustion engine, ammonia $NH_3$ generated from $NO_x$ contained inside the exhaust gas is stored inside the $NO_x$ selective reducing catalyst, and $NO_x$ not stored inside the $NO_x$ storage catalyst is reduced by the ammonia $NH_3$ at the $NO_x$ selective reducing catalyst.

In this regard, it is known that, with an $NO_x$ selective reducing catalyst, $NO_x$ is optimally reduced when the ratio between the NO and the $NO_2$ contained in the exhaust gas is 1:1. However, the majority of $NO_x$ contained in the exhaust gas is NO. Accordingly, in this internal combustion engine, the $NO_2$ producing catalyst is arranged upstream of the $NO_x$ selective reducing catalyst so that this $NO_2$ producing catalyst converts the NO contained in the exhaust gas to $NO_2$ as much as possible.

In this regard, it has been found that when using an oxidation catalyst as an $NO_2$ producing catalyst, if the exhaust gas contains $SO_x$, the $SO_x$ will obstruct the action of conversion of NO to $NO_2$ and as a result lower the purification rate of $NO_x$. However, in the above internal combustion engine, there is no suggestion of the drop in the $NO_x$ purification rate due to $SO_x$.

DISCLOSURE OF THE INVENTION

An object of the present invention is to provide an exhaust purification device of an internal combustion engine capable of converting NO to $NO_2$ well in an oxidation catalyst.

According to the present invention, there is provided an exhaust purification device of an internal combustion engine arranging an $NO_x$ selective reducing catalyst inside an engine exhaust passage, feeding urea to the $NO_x$ selective reducing catalyst, and using an ammonia generated from the urea to selectively reduce $NO_x$ contained in an exhaust gas, wherein an oxidation catalyst is arranged inside the engine exhaust passage upstream of the $NO_x$ selective reducing catalyst and an $NO_x$ adsorption catalyst is arranged inside the engine exhaust passage upstream of the oxidation catalyst, the $NO_x$ adsorption catalyst having a property of adsorbing the $NO_x$ contained in the exhaust gas when a temperature of the $NO_x$ adsorption catalyst is low and releasing an adsorbed $NO_x$ when the temperature of the $NO_x$ adsorption catalyst rises and having a property of trapping $SO_x$ contained in the exhaust gas, an inflow of $SO_x$ to the oxidation catalyst is suppressed by the $NO_x$ adsorption catalyst to thereby prevent the NO released from the $NO_x$ adsorption catalyst being oxidized to $NO_2$ at the oxidation catalyst from being obstructed by the $SO_x$.

In the present invention, when the temperature of the $NO_x$ adsorption catalyst or the $NO_x$ selective reducing catalyst is low, the $NO_x$ contained in the exhaust gas is adsorbed at the $NO_x$ adsorption catalyst, and $SO_x$ contained in the exhaust gas is trapped at the $NO_x$ adsorption catalyst. On the other hand, when the temperature of the $NO_x$ adsorption catalyst or the $NO_x$ selective reducing catalyst rises, $NO_x$ is released from the $NO_x$ adsorption catalyst. At this time, $SO_x$ is not released from the $NO_x$ adsorption catalyst and, accordingly, $SO_x$ does not flow into the oxidation catalyst, so the released NO is converted well to $NO_2$ at the oxidation catalyst.

BRIEF DESCRIPTION OF THE DRAWINGS

FIG. 4 is a flowchart for executing a different embodiment of $SO_x$ poisoning recovery control.

BEST MODE FOR CARRYING OUT THE INVENTION

Figure 1:
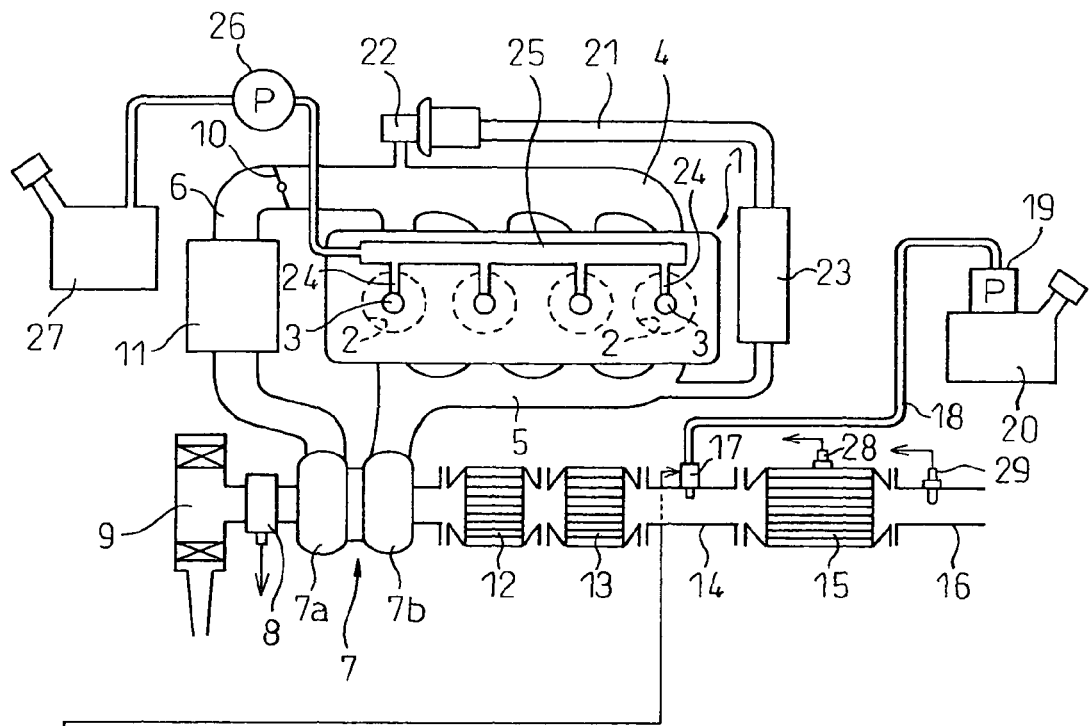
FIG. 1 is an overall view of a compression ignition type internal combustion engine.
Figure 1:
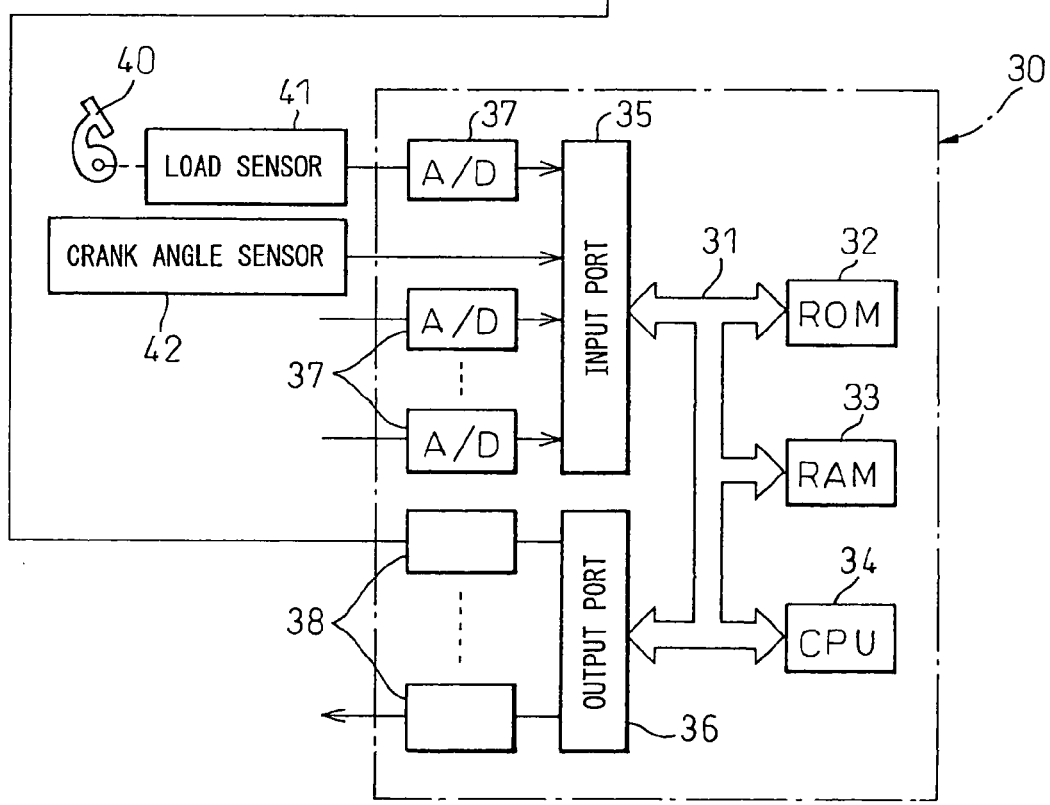

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air amount detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of a $NO_x$ adsorption catalyst 12. An oxidation catalyst 13 is arranged downstream of the $NO_x$ adsorption catalyst 12, and the outlet of the oxidation catalyst 12 is connected through an exhaust pipe 14 to the inlet of an $NO_x$ selective reducing catalyst 15. An exhaust pipe 16 is connected to the outlet of this $NO_x$ selective reducing catalyst 15.

Inside an exhaust pipe 14 upstream of the $NO_x$ selective reducing catalyst 15, an aqueous urea solution feed valve 17 is arranged. This aqueous urea solution feed valve 17 is connected through a feed pipe 18 and a feed pump 19 to an aqueous urea solution tank 20. The aqueous urea solution stored inside the aqueous urea solution tank 20 is injected by the feed pump 19 into the exhaust gas flowing within the exhaust pipe 14 from the aqueous urea solution feed valve 17, while the ammonia $(NH_2)_2CO+H_2O \rightarrow 2NH_3+CO_2$) generated from urea causes the $NO_x$ contained in the exhaust gas to be reduced in the $NO_x$ selective reducing catalyst 15.

The exhaust manifold 5 and the intake manifold 4 are connected to each other through an exhaust gas recirculation (hereinafter referred to as the "EGR") passage 21. Inside the EGR passage 21 is arranged an electronic control type EGR control valve 22. Further, around the EGR passage 21 is arranged a cooling device 23 for cooling the EGR gas flowing through the inside of the EGR passage 21. In the embodiment shown in FIG. 1, the engine cooling water is guided through the cooling device 23, where the engine cooling water is used to cool the EGR gas. On the other hand, each fuel injector 3 is connected through a fuel feed pipe 24 to a common rail 25. This common rail 25 is connected through an electronically controlled variable discharge fuel pump 26 to a fuel tank 27. The fuel stored in the fuel tank 27 is fed by the fuel pump 26 into the common rail 25, and the fuel fed to the inside of the common rail 25 is fed through each fuel pipe 24 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. A temperature sensor 28 for detecting the temperature of the $NO_x$ selective reducing catalyst 15 is arranged in the $NO_x$ selective reducing catalyst 15, and a $NO_x$ sensor 29 for detecting the $NO_x$ concentration in the exhaust gas flowing out from the $NO_x$ selective reducing catalyst 15 is arranged in the exhaust pipe 16. The output signals of these temperature sensor 28, $NO_x$ sensor 29, and intake air amount detector 8 are input through corresponding AD converters 37 into the input port 35.

On the other hand, the accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crank shaft rotates by for example 15° connected to it. On the other hand, the output port 36 is connected through corresponding drive circuits 38 to the fuel injectors 3, throttle valve 10 drive step motor, aqueous urea solution feed valve 17, feed pump 19, EGR control valve 22, and fuel pump 26.

The substrate of the $NO_x$ adsorption catalyst 12 is made of cordierite or a metal having a large number of pores. On this substrate is formed a layer of a catalyst carrier made of zeolite, alumina $Al_2O_3$, zirconia $ZrO_2$, titania $TiO_2$, or the like. On this catalyst carrier, a base metal catalyst made of iron Fe or silver Ag or a precious metal catalyst such as platinum is carried. This $NO_x$ adsorption catalyst 12 has a property of adsorbing $NO_x$ contained in the exhaust gas when the temperature of the $NO_x$ adsorption catalyst 12 is low and releasing the adsorbed $NO_x$ when the temperature of the $NO_x$ adsorption catalyst 12 rises. Further, this $NO_x$ adsorption catalyst 12 has a property of trapping $SO_x$ contained in the exhaust gas.

In this regard, the $NO_x$ adsorbed at the $NO_x$ adsorption catalyst 12 is released from the $NO_x$ adsorption catalyst 12 when the temperature of the $NO_x$ adsorption catalyst 12 exceeds approximately 200° C. However, the $SO_x$ trapped at the $NO_x$ adsorption catalyst 12 is not released from the $NO_x$ adsorption catalyst 12 even when the temperature of the $NO_x$ adsorption catalyst 12 exceeds 200° C. This $SO_x$ is not released from the $NO_x$ adsorption catalyst 12 even if the temperature of the $NO_x$ adsorption catalyst 12 rises to approximately 500° C.

On the other hand, the oxidation catalyst 13 carries a precious metal catalyst made of platinum for example. This oxidation catalyst 13 performs an action of oxidizing the NO contained in the exhaust gas to convert it to $NO_2$. On the other hand, the $NO_x$ selective reducing catalyst 15 is made from Fe/zeolite which adsorbs ammonia at a low temperature and has a high $NO_x$ purification rate or is made from $V_2O_5/TiO_2$.

Figure 2:
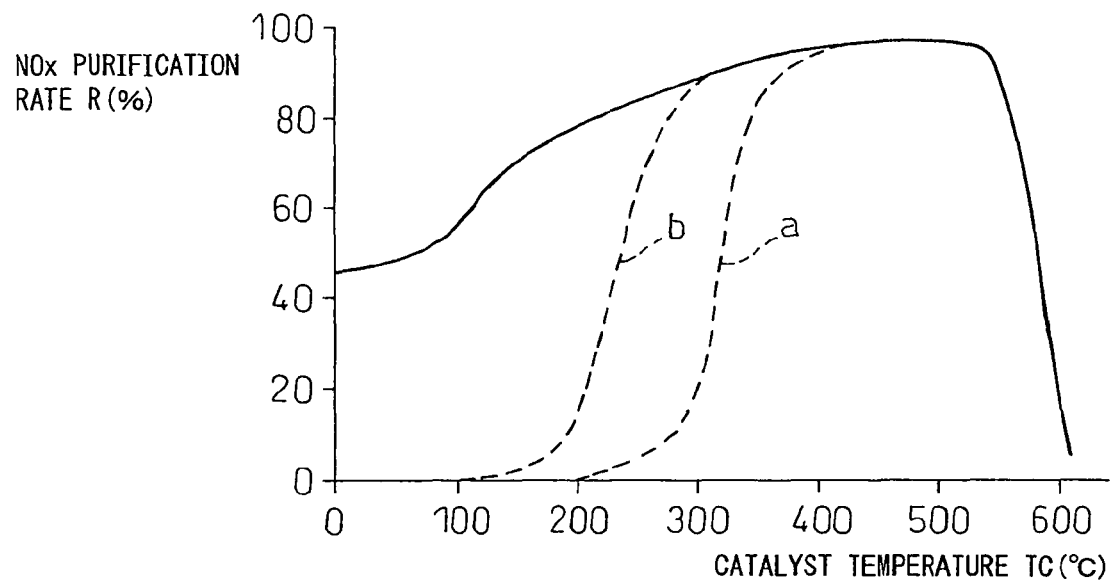
FIG. 2 is a view showing the $NO_x$ purification rate R.
Figure 2:
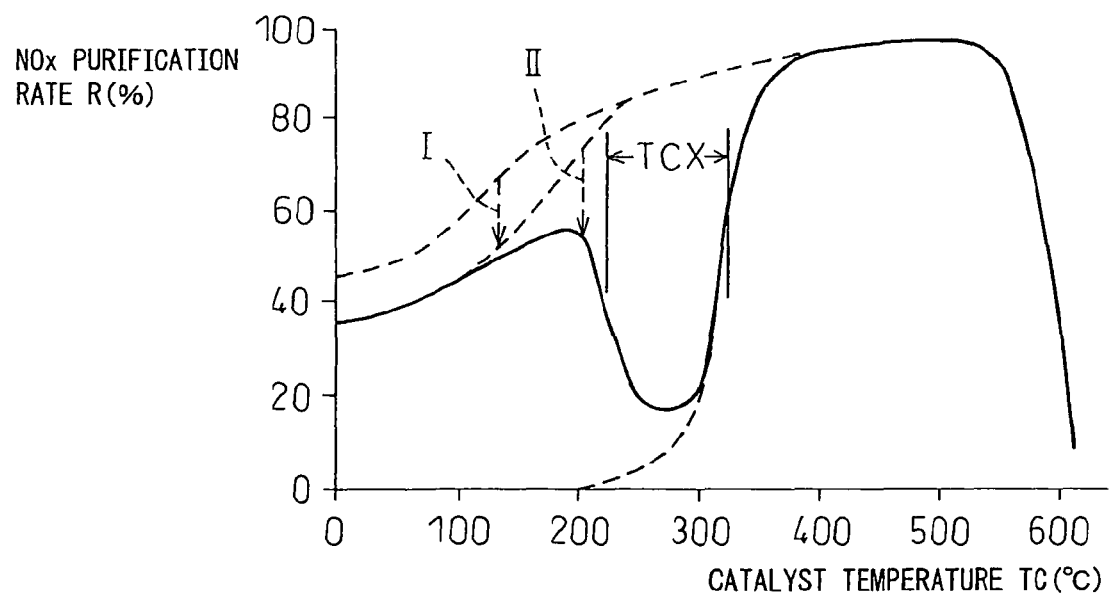

Next, referring to FIG. 2(A), the $NO_x$ purification performance by the exhaust purification device of the present invention will be explained. The $NO_x$ purification rate R (%) by the exhaust purification device of the present invention is shown as a solid line in FIG. 2(A). Note that, the horizontal axis of FIG. 2(A) shows the temperature TC (° C.) of the $NO_x$ selective reducing catalyst 15.

The $NO_x$ purification rate R when the $NO_x$ adsorption catalyst 12 and the oxidation catalyst 13 are not provided at FIG. 1, that is, the $NO_x$ purification rate R by only the $NO_x$ selective reducing catalyst 15, as shown by the broken line a in FIG. 2(A), begins to fall when the catalyst temperature TC is below 400° C. Accordingly, in this case, when the catalyst temperature TC becomes 300° C. or less, almost none of the $NO_x$ can be purified any longer. In the present invention, by arranging the oxidation catalyst 13 upstream of the $NO_x$ selective reducing catalyst 15, the $NO_x$ purification rate R is raised to the position shown by the broken line b in FIG. 2(A), and by arranging the $NO_x$ adsorption catalyst 12 upstream of the oxidation catalyst 13, the $NO_x$ can be purified at low temperature region of 200° C. or below as shown by the solid line.

That is, when the catalyst temperature TC is lower than approximately 200° C., a considerable portion of the $NO_x$ contained in the exhaust gas is adsorbed in the $NO_x$ adsorption catalyst 12, thereby achieving a comparatively high $NO_x$ purification rate R. On the other hand, when the catalyst temperature TC becomes higher than approximately 200° C., $NO_x$, that is, NO, is released from the $NO_x$ adsorption catalyst 12 and this $NO_x$ is oxidized at the oxidation catalyst 13 to $NO_2$. As a result, the NO released from the $NO_x$ adsorption catalyst 12 is reduced well by the $NO_x$ selective reducing catalyst 15.

That is, in the $NO_x$ selective reducing catalyst 15, the ammonia $NH_3$ generated from the urea as mentioned above selectively reduces the $NO_x$ contained in the exhaust gas. The reaction formula with the fastest speed at this time is shown by the following formula:

$$NO+NO_2+2NH_3 \rightarrow 2N_2+3H_2O$$

It is known from the above formula that the reaction speed is at its fastest and thereby the $NO_x$ purification rate is at its highest when the ratio between the NO to $NO_2$ in the exhaust gas is 1:1, that is, when the ratio of $NO_2$ to $(NO+NO_2)$ in the exhaust gas, in other words, the ratio of $NO_2$ with respect to $NO_x$ in the exhaust gas, is 50%.

Accordingly, if arranging the oxidation catalyst 13, the amount of $NO_2$ in the exhaust gas is increased, so the ratio of $NO_2$ with respect to the $NO_x$ in the exhaust gas flowing into the $NO_x$ selective reducing catalyst 15 will become close to 50%, thus the $NO_x$ purification rate in the area between the broken line a and the broken line b of FIG. 2(A) will be increased.

In this regard, during the course of research by the inventors, it was found that if the exhaust gas flowing into the oxidation catalyst 13 contains $SO_x$, this $SO_x$ will obstruct the conversion of NO to $NO_2$ in the oxidation catalyst 13 and as a result lower the $NO_x$ purification rate. In this case, the decrease in the $NO_x$ purification rate by the $SO_x$ is caused by the precious metal catalyst carried by the oxidation catalyst 13, that is, platinum, being poisoned by $SO_x$. That is, if the surface of the platinum is covered by $SO_x$, the platinum will lose its NO oxidizing ability and the amount of produced $NO_2$ will decrease, resulting in a drop in the $NO_x$ purification rate.

Here, in the present invention, in order to keep $SO_x$ from flowing into the oxidation catalyst 13, the $NO_x$ adsorption catalyst 12 is given a function of trapping the $SO_x$ in the exhaust gas. That is, in the present invention, the inflow of $SO_x$ to the oxidation catalyst 13 is suppressed by the $NO_x$ adsorption catalyst 12 and the NO released from the $NO_x$ adsorption catalyst 12 being oxidized into $NO_2$ at the oxidation catalyst 13 is made to be not obstructed by the $SO_x$, thus, as shown by the solid line in FIG. 2(A), a high $NO_x$ purification rate is achieved over a wide range of low temperature to high temperature of the catalyst temperature TC.

In this regard, the amount of trapped $SO_x$ of the $NO_x$ adsorption catalyst 12 grows along with the elapse of time. When the amount of trapped $SO_x$ of the $NO_x$ adsorption catalyst 12 increases, the $NO_x$ adsorption ability of the $NO_x$ adsorption catalyst 12 decreases. Further, when the amount of trapped $SO_x$ of the $NO_x$ adsorption catalyst 12 increases, the $SO_x$ trapping ability of the $NO_x$ adsorption catalyst 12 also decreases. When the $SO_x$ trapping ability of the $NO_x$ adsorption catalyst 12 decreases, $SO_x$ flows into the oxidation catalyst 13, which causes the precious metal catalyst carried by the oxidation catalyst 13 to be poisoned by the $SO_x$. The solid line of FIG. 2(B) shows the $NO_x$ purification rate R when the $NO_x$ adsorption ability and the $SO_x$ trapping ability of the $NO_x$ adsorption catalyst 12 fall.

That is, when the $NO_x$ adsorption ability of the $NO_x$ adsorption catalyst 12 decreases, the $NO_x$ purification rate when the temperature TC of the $NO_x$ selective reducing catalyst 15 is low decreases. The amount by which the $NO_x$ purification rate R decreases due to this decrease of the $NO_x$ adsorption ability is shown by I in FIG. 2(B). Further, the amount by which the $NO_x$ purification rate R decreases due to $SO_x$ poisoning of the precious metal catalyst carried by the oxidation catalyst 13 is shown by II in FIG. 2(B).

As is clear from FIG. 2(B), the decrease in the $NO_x$ purification rate R due to $SO_x$ poisoning of the precious metal catalyst carried by the oxidation catalyst 13 appears remarkably. This decrease in the $NO_x$ purification rate R occurs at a specific $NO_x$ selective reducing catalyst temperature region TCX. This specific temperature region TCX is a temperature region at which the generation of $NO_2$ increases the $NO_x$ purification rate of the $NO_x$ selective reducing catalyst 15, that is, the temperature region between the broken line a and the broken line b in FIG. 2(A). This specific temperature region TCX is the range of 230° C. to 330° C.

When the $NO_x$ purification rate R decreases as shown in FIG. 2(B), it is necessary for $SO_x$ poisoning recovery processing to be performed to restore the $NO_x$ purification rate R to the state shown in FIG. 2(A). This $SO_x$ poisoning recovery processing is performed by injecting additional fuel into the combustion chamber at the end of the compression stroke or arranging a fuel feed valve inside the engine exhaust passage upstream of the $NO_x$ adsorption catalyst 12 and injecting fuel into the exhaust gas from the fuel feed valve to thereby raise the temperature of the $NO_x$ adsorption catalyst 12 to 500° C. or more or make the fuel-air ratio of the exhaust gas flowing into the $NO_x$ adsorption catalyst 12 rich.

In this regard, in this case, what criteria is used for performing $SO_x$ poisoning recovery processing is the issue. When examining this, it is shown that the amount of $SO_x$ contained in the exhaust gas is far smaller in comparison to the amount of $NO_x$ contained in the exhaust gas. Accordingly, as shown by I in FIG. 2(B), the decrease in the $NO_x$ purification rate R stemming from the trapping of $SO_x$ at the $NO_x$ adsorption catalyst 12 does not become that large. As opposed to this, as shown by II in FIG. 2(B), the decrease in the $NO_x$ purification rate R stemming from $SO_x$ poisoning of the precious metal catalyst of the oxidation catalyst 13 appears extremely large. If the decrease in the $NO_x$ purification rate R appears largely, it can be judged appropriately without misjudgment that this is a time that $SO_x$ poisoning recovery processing should be performed.

Therefore, in the present invention $SO_x$ poisoning recovery processing on the $NO_x$ adsorption catalyst 12 and oxidation catalyst 13 is carried out when the $NO_x$ purification rate R at a specific catalyst temperature TCX decreases below a predetermined level.

Figure 3:
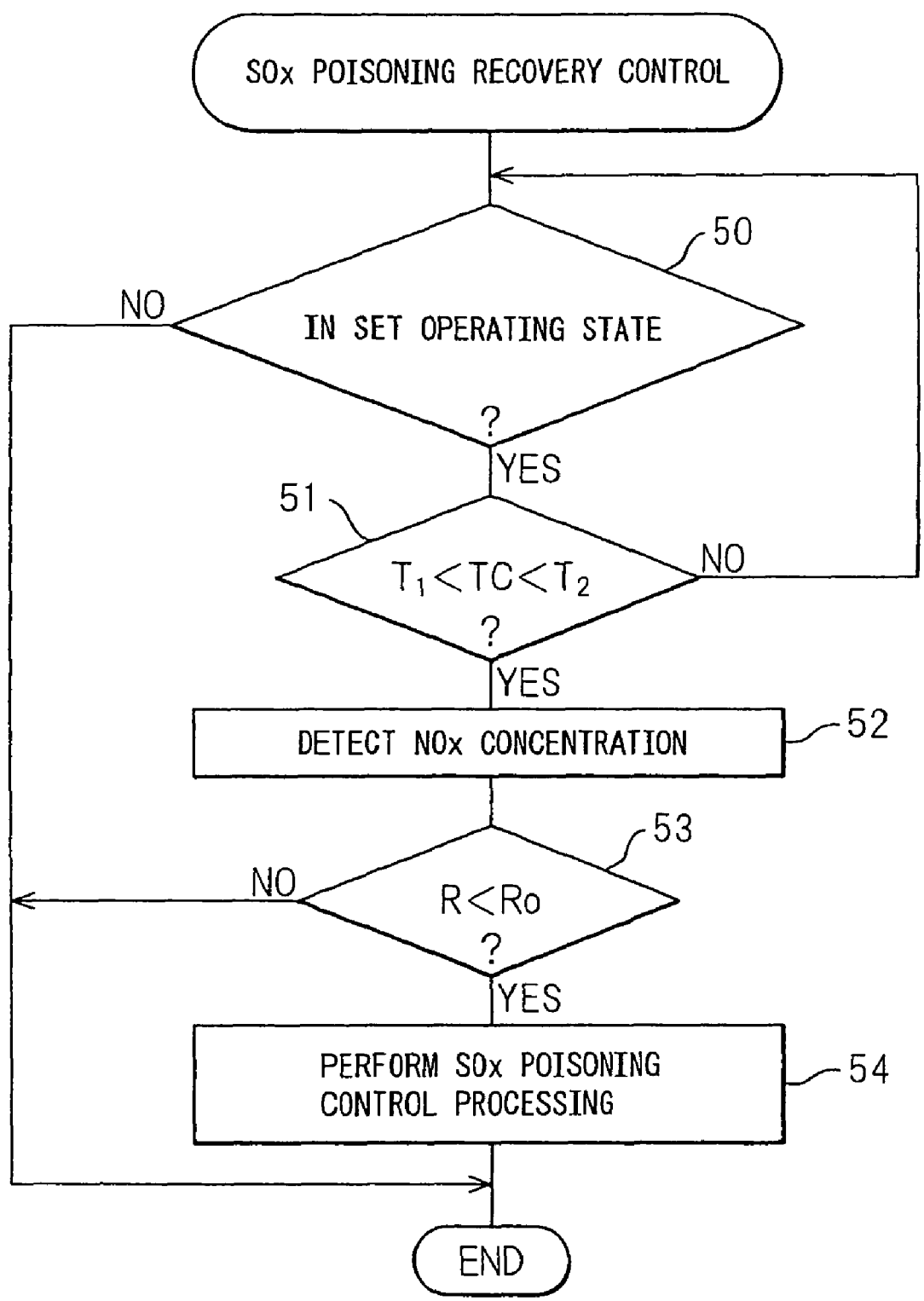
FIG. 3 is a flowchart for executing the $SO_x$ poisoning recovery control.

FIG. 3 shows an $SO_x$ poisoning recovery control routine. This routine is executed by interruption at constant intervals or constant driving distances.

Referring to FIG. 3, first, at step 50, it is judged if the engine is in a preset operating state. Next, at step 51, it is judged if the temperature TC of the $NO_x$ selective reducing catalyst 15 is more than $T_1$, for example 230° C., and less than T2, for example 330° C., that is, if it is within the specific temperature region TCX. When the catalyst temperature TC is not within the specific temperature region TCX, the routine returns to step 50. As opposed to this, when the catalyst temperature TC is within the specific temperature region TCX, the routine proceeds to step 52.

At step 52, the $NO_x$ concentration in the exhaust gas is detected by the $NO_x$ sensor 29. The $NO_x$ concentration in the exhaust gas exhausted from the engine when in the set operation state is stored in advance. At step 53, it is judged if the $NO_x$ purification rate R found from the ratio of the $NO_x$ concentration detected by the $NO_x$ sensor 29 to the stored $NO_x$ concentration is a predetermined level $R_0$ or less. When the $NO_x$ purification rate R is below the predetermined level $R_0$, the routine proceeds to step 54, where the $SO_x$ poisoning recovery processing is performed.

The amount of $NO_x$ exhausted from the engine is most stable when idling. Further, it is easy for the catalyst temperature TC to be in the specific temperature region TCX when idling. Accordingly, in the embodiment of the present invention, the set operating state at step 50 of FIG. 3 is made the idling operating state. That is, in the embodiment of the present invention, when the engine is idling, it is judged if the $NO_x$ purification rate R at the specific catalyst temperature TCX drops below the predetermined level $R_0$. When it is judged that $R<R_0$, $SO_x$ poisoning recovery processing is performed.

FIG. 4 shows another embodiment of the $SO_x$ poisoning recovery control routine. Step 50 to step 54 of the routine shown in FIG. 4 are identical to step 50 to step 54 of the routine shown in FIG. 3, accordingly the explanations for step 50 to step 54 are omitted.

Referring to FIG. 4, at step 51, when it is judged that the catalyst temperature TC is not within the specific temperature region TCX, the routine proceeds to step 55, where it is judged if the catalyst temperature TC is lower than $T_1$. When $TC \geq T_1$, the routine returns to step 50, whereas when $TC<T_1$, the routine proceeds to step 56 then returns to step 50 after temperature raising control of the $NO_x$ selective reducing catalyst 15 is performed. This temperature raising control also is performed by feeding additional fuel into the combustion chamber while in the exhaust stroke for example.

In the routine shown in FIG. 3, when the catalyst temperature TC is not within the specific temperature region TCX when the $SO_x$ poisoning recovery control has started, the routine waits until the catalyst temperature TC is within the specific temperature region TCX. As opposed to this, in the routine shown in FIG. 4, when the catalyst temperature TC is not within the temperature region TCX when the SOX poisoning recovery control has started, if the catalyst temperature TC is higher than the specific temperature region, the routine waits the catalyst temperature TC to become within the specific temperature TCX, while when the catalyst temperature TC is lower than the specific temperature region TCX, the $NO_x$ selective reducing catalyst 15 is raised until the catalyst temperature TC is within the specific temperature region TCX.

LIST OF REFERENCE NUMERALS

4 ... intake manifold
5 ... exhaust manifold
7 ... exhaust turbocharger
12 ... $NO_x$ adsorption catalyst
13 ... oxidation catalyst
15 ... $NO_x$ selective reducing catalyst
17 ... aqueous urea feed valve
29 ... $NO_x$ sensor

The invention claimed is:

1. An exhaust purification device of an internal combustion engine, the device comprising:
an $NO_x$ selective reducing catalyst disposed in an engine exhaust passage, the $NO_x$ selective reducing catalyst using an ammonia generated from urea fed to the $NO_x$ selective reducing catalyst to selectively reduce $NO_x$ contained in an exhaust gas;
an oxidation catalyst disposed in the engine exhaust passage upstream of the $NO_x$ selective reducing catalyst;
an $NO_x$ adsorption catalyst disposed in the engine exhaust passage upstream of the oxidation catalyst, the $NO_x$ adsorption catalyst having a property of adsorbing the $NO_x$ contained in the exhaust gas when a temperature of the $NO_x$ adsorption catalyst is below a predetermined temperature and releasing an adsorbed $NO_x$ when the temperature of the $NO_x$ adsorption catalyst is above the predetermined temperature and having a property of trapping $SO_x$ contained in the exhaust gas, such that an inflow of the $SO_x$ to the oxidation catalyst is suppressed by the $NO_x$ adsorption catalyst to thereby prevent the $SO_x$ from obstructing NO released from the $NO_x$ adsorption catalyst from being oxidized to $NO_2$ at the oxidation catalyst;
an $NO_x$ purification rate by the $NO_x$ selective reducing catalyst decreasing at a predetermined specific $NO_x$ selective reducing catalyst temperature region when the $SO_x$ flows into the oxidation catalyst; and
an electronic control unit that causes $SO_x$ poisoning recovery processing to be performed on the $NO_x$ adsorption catalyst and the oxidation catalyst when the $NO_x$ purification rate at the specific $NO_x$ selective reducing catalyst temperature region has fallen below a predetermined level.

2. An exhaust purification device of an internal combustion engine as claimed in claim 1, wherein said specific $NO_x$ selective reducing catalyst temperature region is 230° C. to 330° C.

3. An exhaust purification device of an internal combustion engine as claimed in claim 1, wherein the electronic control unit determines whether the $NO_x$ purification rate at the specific $NO_x$ selective reducing catalyst temperature region has fallen below the predetermined level when the engine, is in an engine idling operating state.

* * * * *